United States Patent [19]
Arns

[11] Patent Number: 5,198,914
[45] Date of Patent: Mar. 30, 1993

[54] AUTOMATIC CONSTANT WAVELENGTH HOLOGRAPHIC EXPOSURE SYSTEM

[75] Inventor: James A. Arns, Los Angeles, Calif.

[73] Assignee: Hughes Aircraft Company, Los Angeles, Calif.

[21] Appl. No.: 798,486

[22] Filed: Nov. 26, 1991

[51] Int. Cl.⁵ ............................................. G03H 1/04
[52] U.S. Cl. ........................................... 359/8; 359/35
[58] Field of Search .................................. 359/1, 8, 35

[56] References Cited

U.S. PATENT DOCUMENTS

| | | | |
|---|---|---|---|
| 3,614,193 | 10/1971 | Beiser | 359/8 |
| 4,707,054 | 11/1987 | Howard et al. | 359/8 |
| 4,714,309 | 12/1987 | Woodcock et al. | 359/34 |
| 5,103,323 | 4/1992 | Macarinos et al. | 359/8 |

Primary Examiner—Bruce Y. Arnold
Assistant Examiner—J. P. Ryan
Attorney, Agent, or Firm—L. A. Alkov; W. K. Denson-Low

[57] ABSTRACT

A hologram exposure system that includes a spherically curved mirror surface positioned adjacent a substrate/hologram assembly that includes a spherically curved hologram recording layer supported by a spherically curved substrate surface, wherein the spherically curved mirror surface is concentric with the spherically curved substrate surface. A first rotating means provides for rotation of the curved mirror surface about a first axis that passes through (a) the center of curvature of the spherically curved substrate surface that supports the hologram recording layer, and (b) a point on the hologram recording layer that allows for convenient rotation about the first axis; and a second rotating means provides for rotation of the curved mirror surface about a second axis that is orthogonal to the first axis and intersects the first axis at the center of curvature of the substrate surface that supports the hologram recording layer. The desired hologram area of the recording layer is holographically exposed by controllably rotating the mirror/recording layer/substrate assembly about the first and second axes while illuminating the assembly with an exposure beam that is incident on the recording layer at the intersection of the recording layer with said first axis and passes through the recording layer to be reflected by said mirror surface.

5 Claims, 2 Drawing Sheets

AUTOMATIC CONSTANT WAVELENGTH HOLOGRAPHIC EXPOSURE SYSTEM

BACKGROUND OF THE INVENTION

The subject invention is directed generally to holographic exposure systems, and more particularly to a constant wavelength holographic exposure system for producing constant wavelength holograms on spherically curved recording media.

Holographic optical elements including constant wavelength spherically curved holograms (i.e., holograms supported by a spherically curved substrate) are utilized for various applications including military head-up displays, visors, and device and eye protection filters.

Curved constant wavelength holograms are presently made pursuant to flood exposure systems wherein the entire holographic recording medium is subjected to exposure illumination at the same time. In order to obtain constant wavelength over the entire format of a hologram generated on a spherically curved substrate, the exposure must be made with a point source located coincident with the center of curvature of the recording film, or with very complex optics that provide for a constant angle of incidence of the exposure illumination at all points of the recording film.

In view of the specific requirements for exposure of a spherically curved constant wavelength hologram, such a hologram would be very difficult to make pursuant to a known technique commonly called "angle tuning" wherein exposure is made with an available wavelength of light and caused to impinge the hologram recording film at an angle from the film normal which subsequently produces fringe spacings greater than would be obtained had the same wavelength exposure light impinged the film at a normal angle of incidence. This produces a hologram at a higher wavelength than would be otherwise possible for the available exposure wavelength (neglecting any film thickness changes resulting from other phases of the hologram production process which follow the exposure).

An "angle tuned" spherically curved constant wavelength might possibly be made by scanning the format with an unexpended exposure beam from a laser that can be wavelength tuned during the exposure process to compensate for fringe spacing changes resulting from variations in incident angle that the exposure beam would experience during the scan. However, such exposure arrangement would be exceedingly difficult to realize.

SUMMARY OF THE INVENTION

It would therefore be an advantage to provide a holographic exposure system for making spherically curved constant wavelength holograms that does not require specific placement of a point source and does not require complex optics.

Another advantage would be to provide a holographic exposure system that can be simply adjusted to produce constant wavelength holograms respectively having different constant peak wavelengths (i.e., each hologram has a different peak wavelength that is constant throughout the hologram format) without the use of complex optics or sophisticated alignments.

Another advantage is to provide a holographic exposure system for making spherically curved constant wavelength holograms without the use of an expensive tunable laser.

The foregoing and other advantages are provided by the invention in a hologram exposure system that includes a spherically curved mirror surface positioned adjacent a substrate/hologram assembly that includes a spherically curved hologram recording layer supported by a spherically curved substrate surface, wherein the spherically curved mirror surface is concentric with the spherically curved substrate surface. A first rotating means provides for rotation of the curved mirror surface about a first axis that passes through (a) the center of curvature of the spherically curved substrate surface that supports the hologram recording layer, and (b) a point on the hologram recording layer that allows for convenient rotation about said first axis; and a second rotating means provides for rotation of the curved mirror surface about a second axis that is orthogonal to the first axis and intersects the first axis at the center of curvature of the substrate surface that supports the hologram recording layer. The desired hologram area of the recording layer is holographically exposed by controllably rotating the mirror/recording layer/substrate assembly about the first and second axes while illuminating the assembly with an exposure beam that is incident on the recording layer at the intersection of the recording layer with said first axis and passes through the recording layer to be reflected by said mirror surface.

BRIEF DESCRIPTION OF THE DRAWINGS

The advantages and features of the disclosed invention will readily be appreciated by persons skilled in the art from the following detailed description when read in conjunction with the drawing wherein.

FIG. is a side elevational view of a constant wavelength hologram exposure system in accordance with the invention which includes a convex exposure mirror surface.

DETAILED DESCRIPTION OF THE DISCLOSURE

Figure 1:
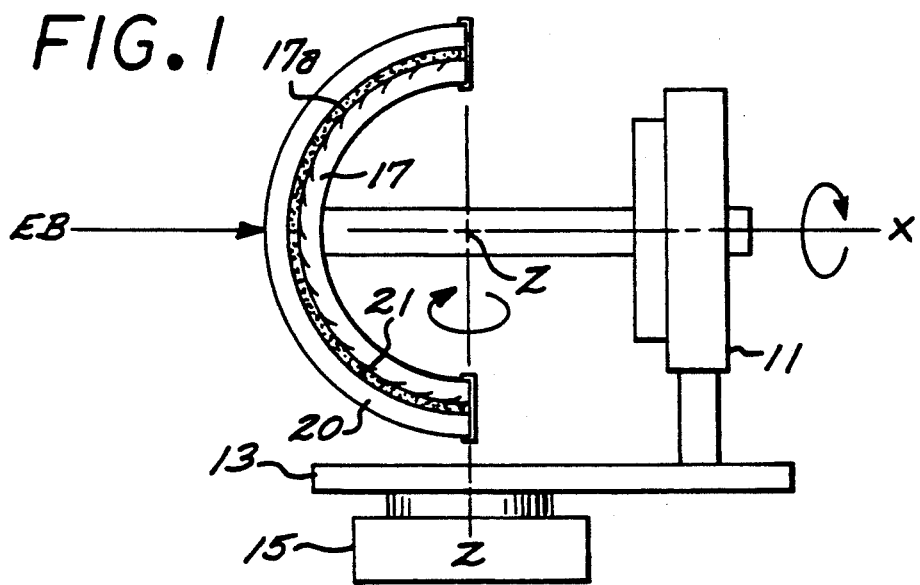

In the following detailed description and in the several figures of the drawing, like elements are identified with like reference numerals.

Figure 2:
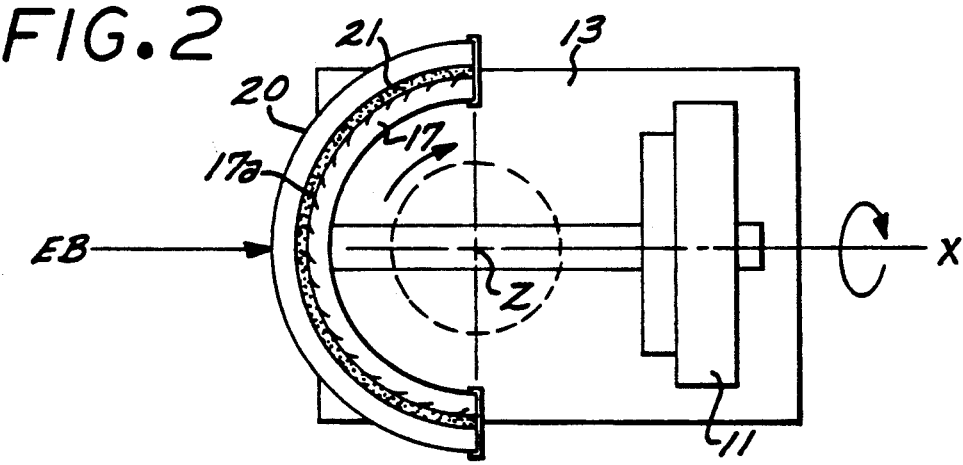
FIG. 2 is a top plan view of the constant wavelength hologram exposure system of FIG. 1.

Referring now to FIGS. 1-2, set forth therein by way of illustrative example is a constant wavelength hologram exposure system in accordance with the invention that includes a first rotation stage 11 that is controlled to rotate an exposure mirror structure 17 which includes a semi-spherical reflecting surface and supports a semi-spherical substrate/recording layer subassembly 20. By way of illustrative example, the substrate/recording layer assembly 20 is supported on the mirror assembly adjacent a convex mirror surface 17a and separated therefrom by a layer of index matching fluid 21. With the convex exposure mirror surface 17a, the exposure illumination is provided by a coherent exposure beam EB that is directed to the convex side of the substrate/recording layer assembly 20. The exposure beam EB is considered to be small in diameter with respect to the curvature of the recording layer so as to cause virtually no angular variation in the exposure. As described more particularly herein relative to FIG. 3, the substrate/recording layer assembly can be supported for exposure illumination from the concave side thereof, in which case the exposure mirror surface 17a would be concave.

The exposure mirror structure 17 is configured for rotation about a horizontal axis X that is defined by (a) the center of curvature C of the substrate surface which supports the recording layer, and (b) a point on the hologram recording layer that allows for convenient rotation about the resulting axis X and for convenient mounting. For ease of reference, such center of curvature C will be called the "exposure center of curvature C".

The first rotation stage 11 is secured to a turntable a turntable platform 13 that is controllably rotated about a vertical axis of rotation Z by a second rotation stage 15. The vertical axis Z passes through the exposure center of curvature C and is orthogonal to the horizontal axis X.

Thus, the mirror surface 17a of the exposure mirror structure 17 is rotatable about first and second orthogonal axes which pass through the exposure center of curvature C and wherein the first axis passes through the hologram recording layer.

Figure 3:
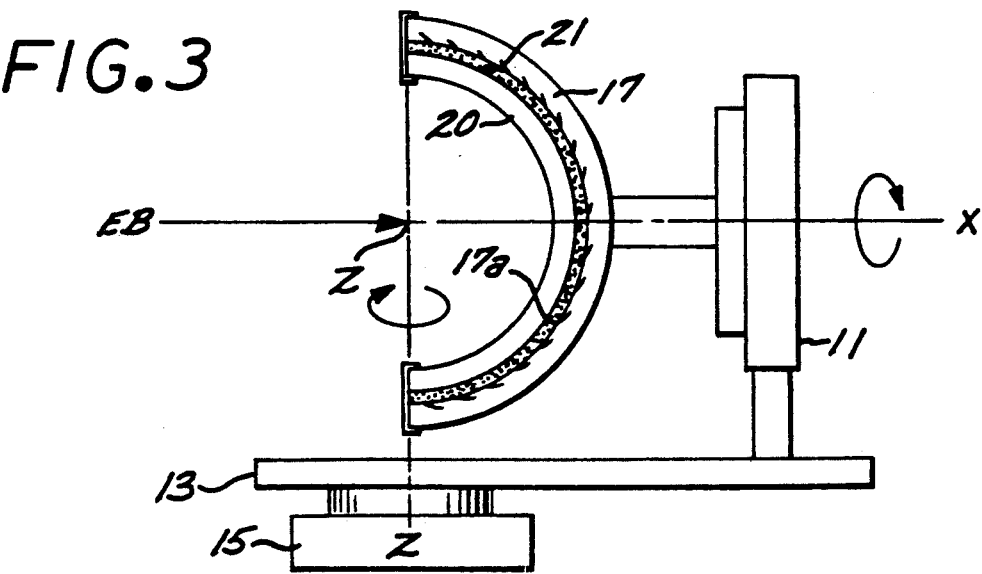
FIG. 3 is a side elevational view of a constant wavelength hologram exposure system in accordance with the invention which includes a concave exposure mirror surface.

FIG. 3 schematically depicts an illustrative example of a hologram recording system in accordance with the invention wherein the exposure mirror surface is concave and the substrate/recording layer subassembly 20 is illuminated by a coherent exposure beam EB that is directed to the concave side of the substrate/recording layer assembly 20. The first rotation stage 11 that provides rotation about the horizontal X axis is attached to the exposure mirror structure on the side opposite the concave mirror surface.

Referring now to the top plan views of FIGS. 4A-4D, the substrate/hologram layer assembly 20 includes a hologram recording layer 23 supported by a transparent substrate 25 whose recording layer supporting side is spherically curved and conforms to the installed shape of the hologram that will result from exposure and development of the hologram recording layer 23. The mirror surface 17a of the exposure mirror structure 17 is concentric with the side of the substrate 25 that supports the recording layer 23, and is positioned to reflect the incoming exposure beam EB that passes through the recording layer back out through the layer, thereby providing the holographic exposure. Provided that the distance between the hologram recording layer 23 and the exposure mirror 17 is small compared to vibrational and pointing inaccuracies of the rotational stages as they provide rotation, the hologram recording layer may be applied to either side of the substrate 25, depending on the intended hologram application.

Figures 4A, 4B:
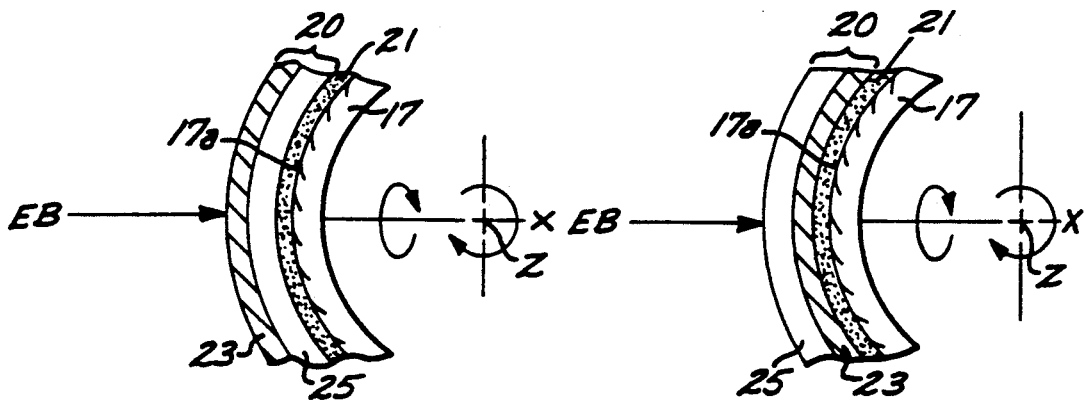
FIGS. 4A-4D schematically illustrate different configurations of the exposure system of FIGS. 1-2 as to placement of the hologram recording layer and the exposure illumination.

FIGS. 4A and 4B particularly illustrate supporting the substrate/recording layer assembly 20 adjacent a convex exposure mirror surface 17a for exposure illumination directed to the convex side of substrate/recording layer assembly 20. Depending upon the hologram application, the hologram recording layer 23 can be on the illumination side of the substrate 25 (FIG. 4A) or on the mirror side of the substrate 25 (FIG. 4B).

Figures 4C, 4D:
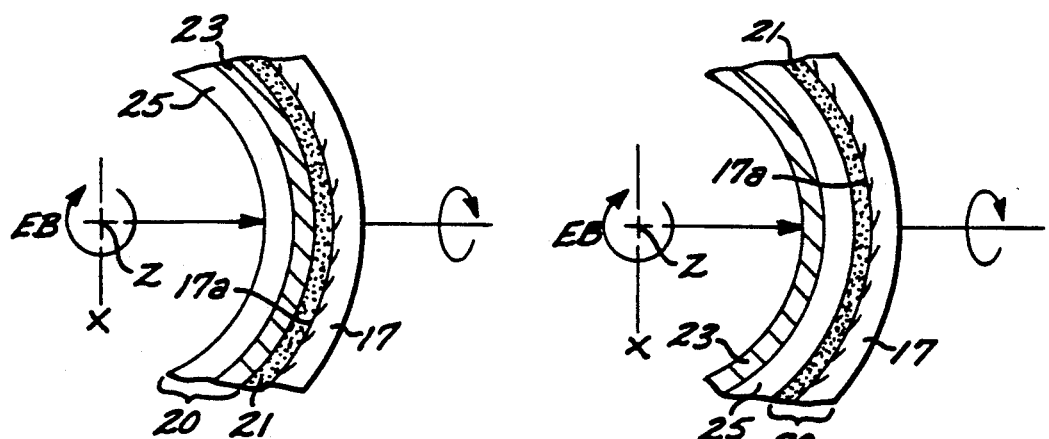

FIGS. 4C and 4D particularly illustrate supporting the substrate/recording layer assembly 20 adjacent a concave exposure mirror surface 17a for exposure illumination directed to the concave side of the substrate/recording layer assembly 20. Depending upon hologram application, the hologram recording layer 23 can be on the mirror side of the substrate 25 (FIG. 4C) or on the illumination side of the substrate (FIG. 4D).

For exposure, the exposure beam EB is fixedly directed at the substrate/recording layer assembly 20 such that it impinges on the hologram recording layer 23 at the point where the horizontal axis of rotation X intersects the recording layer 23. While the exposure beam EB is so directed, the substrate/recording layer assembly 20 is rotated about the horizontal axis X via the first rotation stage 11, and then either (a) continuously rotated about the vertical axis Z via the turntable platform 13 so as to produce a continuous spiral exposure path, or (b) rotated in steps about the vertical axis Z from the center to edge of the substrate/recording layer assembly 20 so as to produce a series of adjacent annular exposure paths.

Figure 5:
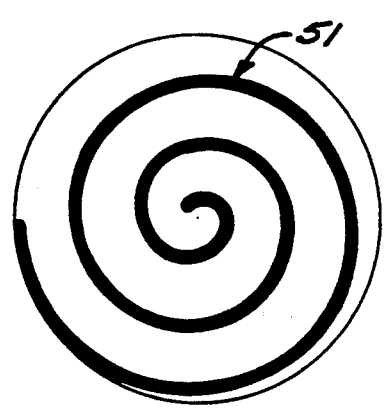
FIG. 5 schematically depicts the spiral exposure track exposed by the constant wavelength hologram exposure system of FIGS. 1-3 pursuant to continuous rotation of the recording medium about a first axis X that passes through the center of curvature of spherically curved substrate and the center thereof, and a second axis Z that passes through the center of curvature and is orthogonal to the first axis.

FIG. 5 is an unscaled schematic depiction of the spiral exposure path 51, with exaggerated spacing, that would be followed on the hologram recording layer 23 pursuant to the first exposure rotation method described above, as viewed along the horizontal axis toward the recording layer.

Figure 6:
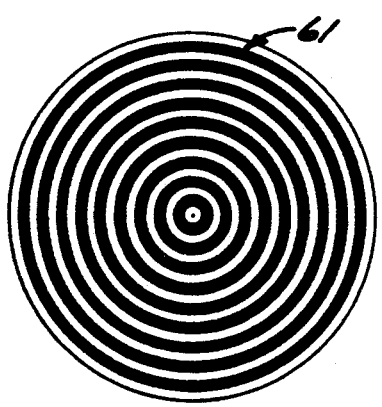
FIG. 6 schematically depicts the concentric exposure tracks exposed by the constant wavelength hologram exposure system of FIGS. 1-3 pursuant to continuous rotation of the recording medium about the first axis X, and stepped rotation thereof about the second axis Z.

FIG. 6 is an unscaled schematic depiction of the concentric exposure paths 61, with exaggerated spacing, that would be followed on the hologram recording layer 23 pursuant to the second exposure rotation method described above, as viewed along the horizontal axis toward the recording layer.

Pursuant to either exposure technique, the desired area of the recording layer 23 is exposed to the coherent exposure beam EB. Further, by virtue of the specific axes of rotation, the angle of the exposure relative to normal of the hologram recording layer 23 at the point where the exposure beam EB impinges on the hologram recording layer 23 remains constant throughout the exposure, which insures the recording of a constant fringe spacing throughout the hologram format. A constant fringe spacing recorded in the recording layer throughout the hologram format results in a constant peak wavelength output when viewed at a constant angle with respect to normal.

For shortest peak wavelength, the exposure beam EB would be aligned with the horizontal axis X so as to expose all points in the exposed area at 0 degrees relative to normal. Directing the exposure beam at the recording layer 23 at angles greater than 0 provides for longer peak wavelengths, with wavelength increasing with increasing angle.

The foregoing has been a disclosure of a holographic exposure system that automatically and efficiently produces a constant wavelength spherical hologram with an exposure beam that can be incident at normal or at angles other than normal. The latter allows the hologram to be built with a wavelength of light incident at an angle from film normal which causes fringe spacings greater than would be obtained with an at normal exposure. This cannot be accomplished with a flood or scanned exposure except by exposing from the center of curvature or compensating for changing angles when exposing from other that the center of curvature by varying the exposing wavelength (i.e., exposing with an expensive tunable laser). The disclosed holographic exposure system further advantageously provides capability of making relatively large spherically curved holographic optical elements, and the capability of implementing spherically curved optical elements having a high degree of curvature and a large field of view with holographic optical elements.

Although the foregoing has been a description and illustration of specific embodiments of the invention, various modifications and changes thereto can be made by persons skilled in the art without departing from the scope and spirit of the invention as defined by the following claims.

What is claimed is:

1. A hologram exposure system for holographically exposing a spherically curved hologram recording layer of a substrate/hologram recording layer assembly wherein the hologram recording layer is supported by a spherically curved substrate, comprising:

a spherically curved mirror surface positioned adjacent the substrate/hologram assembly, said spherically curved mirror surface being concentric with the spherically curved substrate surface;

first means for rotating the curved mirror surface about a first axis that passes through (a) the center of curvature of the spherically curved substrate surface that supports the hologram recording layer, and (b) a point on the hologram recording layer that allows for convenient rotation about said first axis; and second means for rotating the curved mirror surface about a second axis that is orthogonal to the first axis and intersects the first axis at the center of curvature of the substrate surface that supports the hologram recording layer;

whereby the holographic recording layer is holographically exposed by controllably rotating the mirror/recording layer/substrate assembly about the first and second axes while said assembly is illuminated with an exposure beam that is incident on the recording layer at the intersection of the recording layer with said first axis and passes through the recording layer to be reflected by said mirror surface.

2. The hologram exposure system of claim 1 wherein said spherically curved mirror surface is convex.

3. The hologram exposure system of claim 1 wherein said spherically curved mirror surface is concave.

4. The hologram exposure system of claim 1 wherein first rotating means is controlled to rotate continuously, and said second rotating means is controlled to rotate in stepped increments.

5. The hologram exposure system of claim 1 wherein first rotating means is controlled to rotate continuously, and said second rotating means is controlled to rotate continuously.

* * * * *